Nov. 2, 1965   A. G. TALBERT   3,215,449
DETACHABLE GOOSENECK ASSEMBLY
Filed Sept. 19, 1963   4 Sheets-Sheet 1
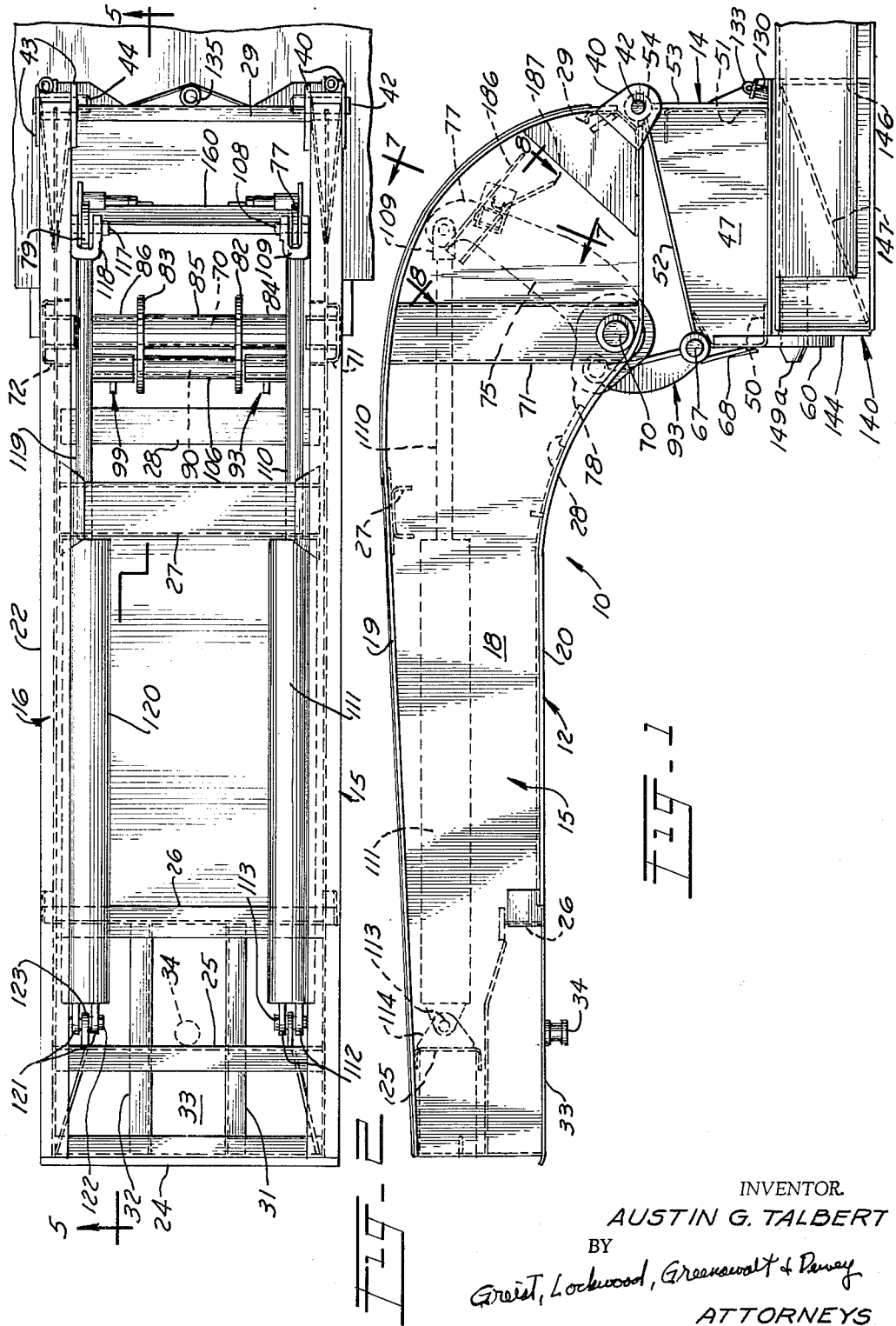
INVENTOR.
AUSTIN G. TALBERT
BY
Greist, Lockwood, Greenawalt & Dewey
ATTORNEYS

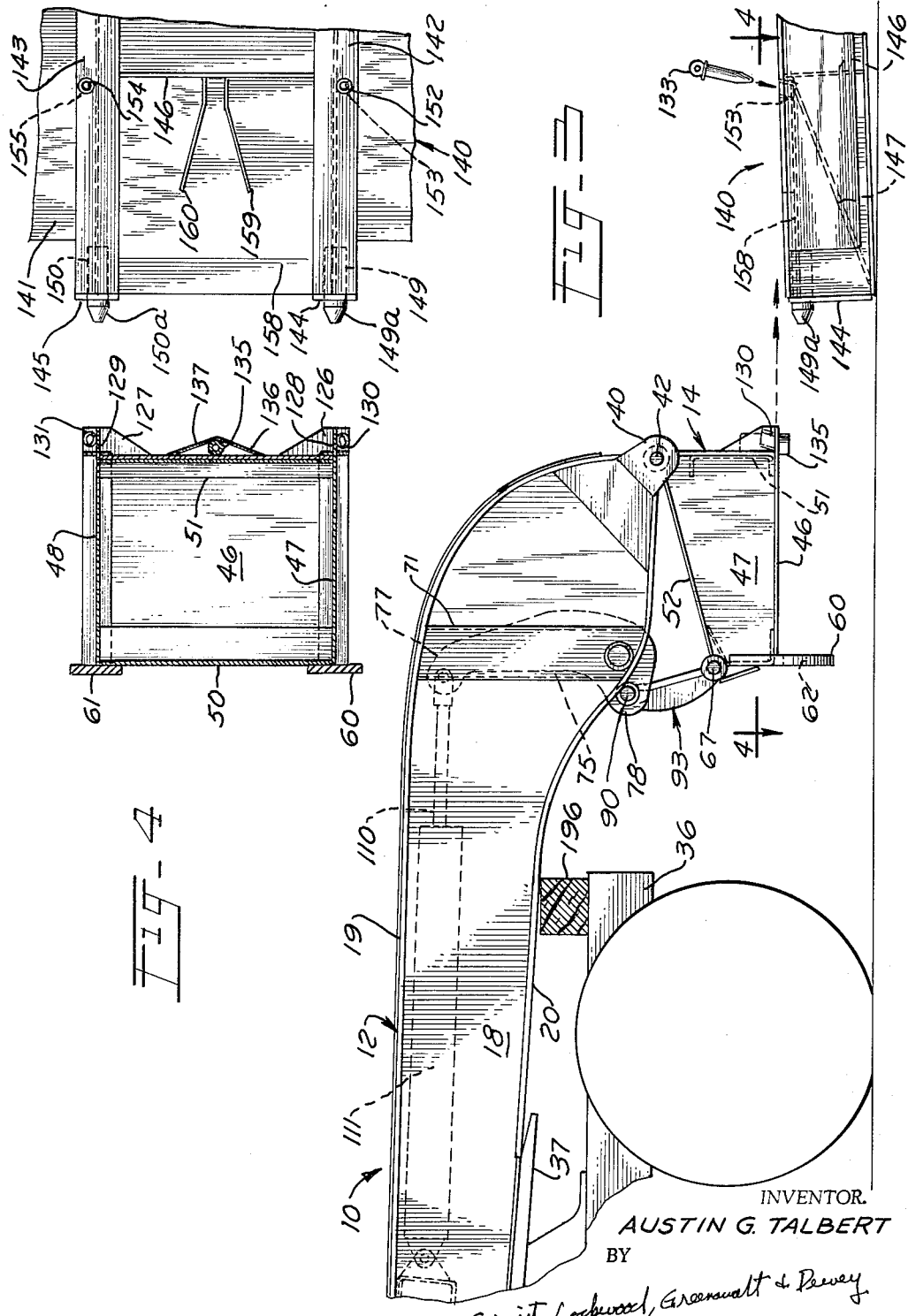

Nov. 2, 1965  A. G. TALBERT  3,215,449
DETACHABLE GOOSENECK ASSEMBLY
Filed Sept. 19, 1963  4 Sheets-Sheet 3
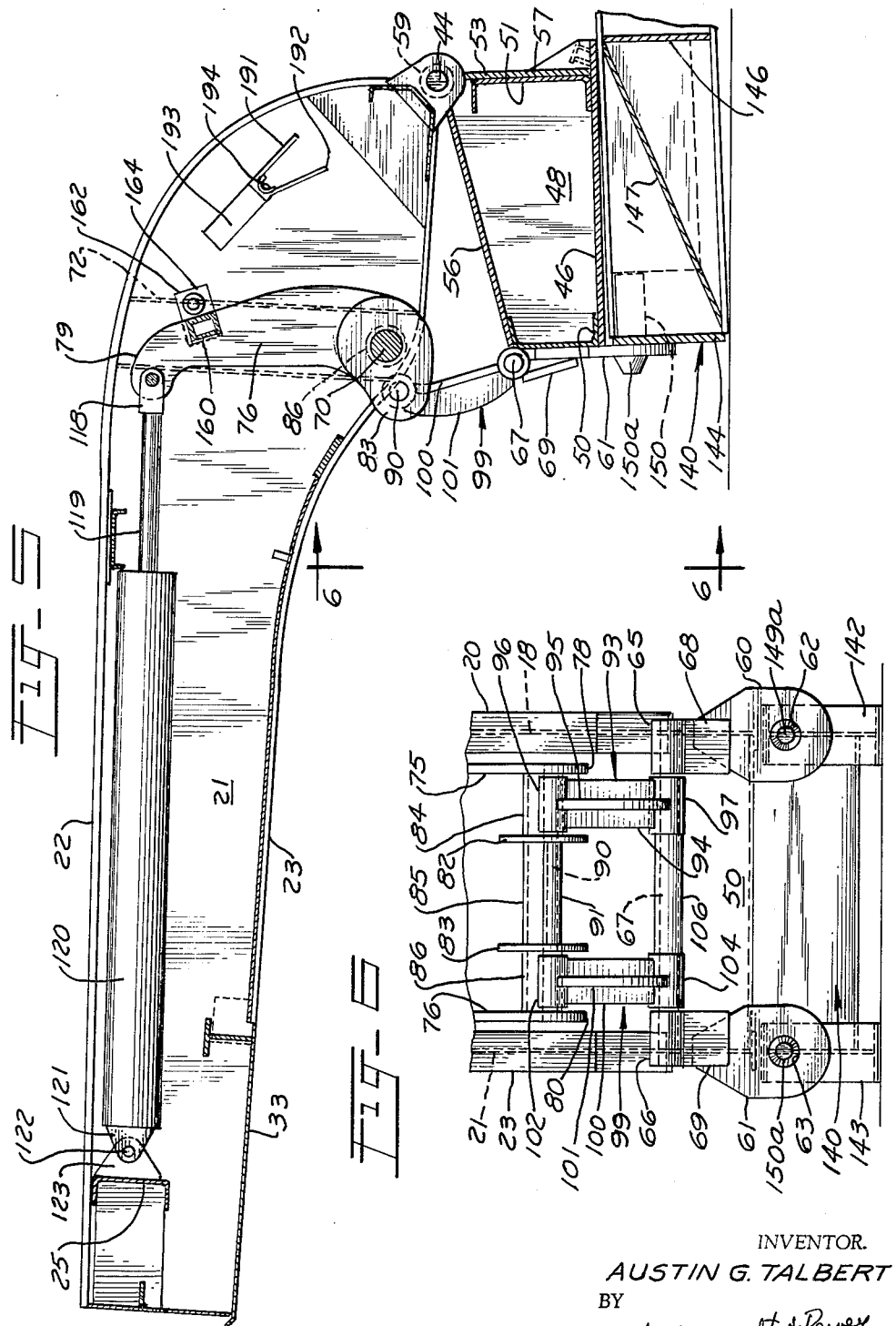
INVENTOR.
AUSTIN G. TALBERT
BY
Greist, Lockwood, Greenawalt & Dewey
ATTORNEYS

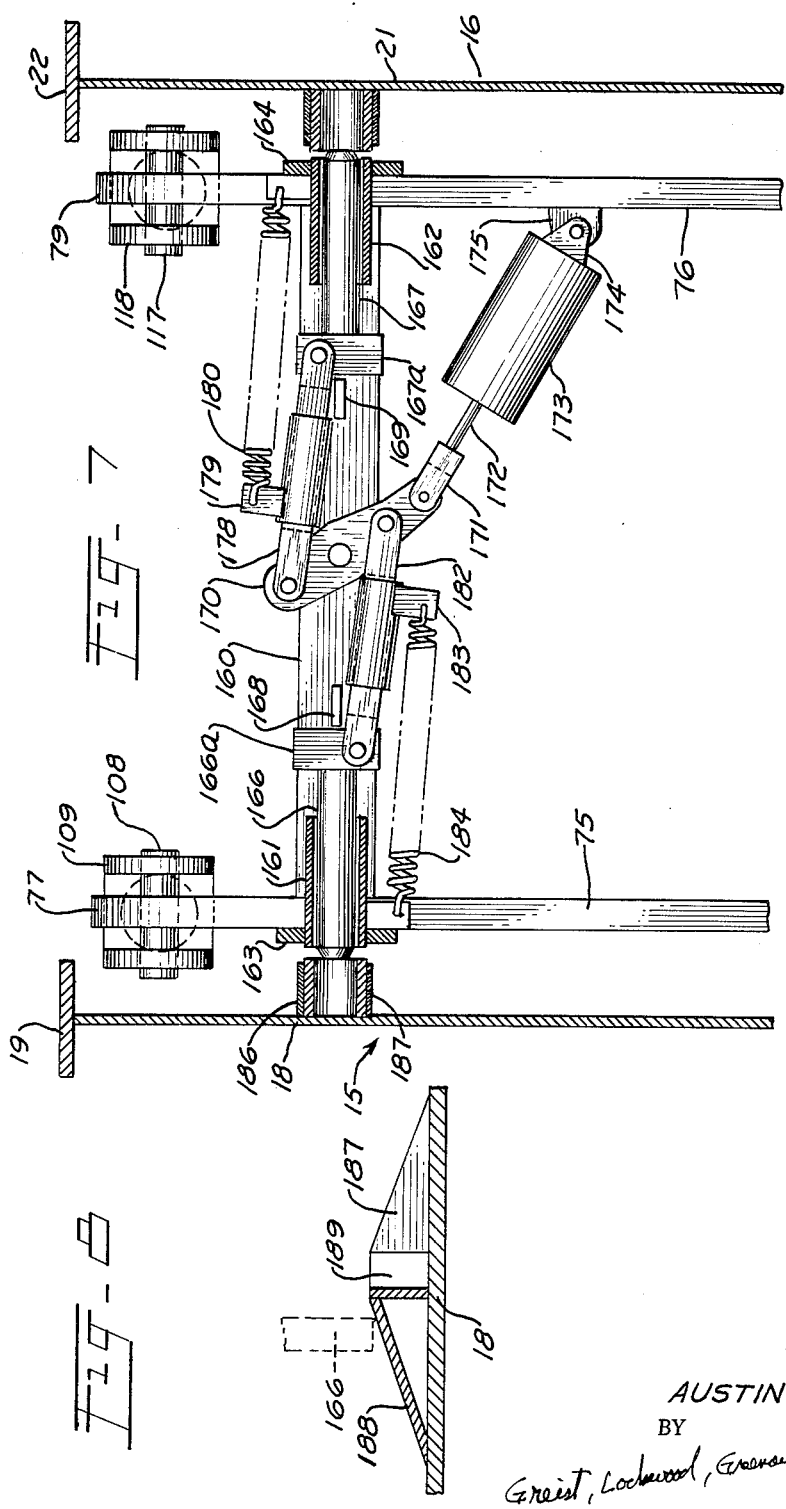

United States Patent Office 3,215,449
Patented Nov. 2, 1965

3,215,449
DETACHABLE GOOSENECK ASSEMBLY
Austin G. Talbert, Rensselaer, Ind., assignor to Talbert Construction Equipment Company, Lyons, Ill., a corporation of Illinois
Filed Sept. 19, 1963, Ser. No. 309,934
9 Claims. (Cl. 280—425)

This invention relates to a detachable gooseneck assembly for trailers or the like, and more particularly to a new and improved detachable gooseneck of the type adapted to engage and lift one end of a low-bed trailer.

Heavy construction equipment, such as cranes, power shovels, large tractors, and the like, are most often transported over highways by what is known as low-bed trailers. These trailers include a long bed having a low center of gravity. One form of low-bed trailer, which is in widespread commercial use, includes an elongated bed having ground engaging wheels only at the rear end thereof. The front end of this type of low-bed trailer is supported by a gooseneck which is detachably secured to the front end of the trailer and which is provided with means for connection with the fifth wheel of a tractor. This type of trailer is loaded from the front end thereof with the gooseneck detached, the front end of the trailer being supported on the ground during loading. After loading the gooseneck is attached to the front end of the trailer. These goosenecks are usually provided with winch and cable arrangements or hydraulic means for lifting the front end of the trailer to its traveling position. Unloading is accomplished by lowering the front end of the trailer by means of the gooseneck, and then detaching the gooseneck allowing the equipment carried by the trailer to be removed from the front end of the latter.

Some prior art goosenecks include a one-piece gooseneck frame which has hydraulically controlled hooks or links at its rear end for detachable engagement with the front end of a trailer. With this form of gooseneck the trailer is not fully locked to the gooseneck until the trailer is elevated to its traveling position. This invention provides for the first time a gooseneck including a draft member and a hydraulically actuated relatively movable base member which is especially adapted for quick and easy engagement with a trailer whereby the lowered front end of a low-bed trailer may be locked with the base member in an expeditious manner and then raised to its traveling position.

Accordingly, it is a primary object of the present invention to provide a gooseneck assembly of simplified construction, which gooseneck assembly includes a draft member and a base member pivotally mounted at the rear end of the draft member, the base member being provided with means adapting it for quick and easy detachable engagement with one end of a low-bed trailer or the like.

A further object of the present invention is the provision of a gooseneck assembly including a draft member and a base member pivotally mounted at the rear end of the draft member, powered means being provided for controlling the angular position of the base member relative to the draft member, and the base member being provided with connection means rigidly secured thereto, whereby the base member may be attached with the front end of the trailer by manipulating the former relative to the draft member and then bringing the base member into engagement with the trailer.

These and other objects and advantages of the invention will become apparent from the following specification describing a preferred embodiment of the invention which is illustrated in the accompanying drawings.

In the drawings:

FIG. 1 is a side elevation of the gooseneck assembly of this invention showing the same in engagement with the front end of a low-bed trailer in its traveling position;

FIG. 2 is a top plan view of the gooseneck assembly of FIG. 1 with certain parts of the locking mechanism not being shown;

FIG. 3 is a side elevational view showing the gooseneck assembly mounted on the rear of a tractor and aligned for being attached to the front end of a low-bed trailer which is supported on the ground;

FIG. 4 is a section taken along line 4—4 of FIG. 3;

FIG. 5 is a section along line 5—5 of FIG. 2 with certain parts of the gooseneck not being illustrated and showing the gooseneck assembly attached to the forward end of a trailer when the forward end of the latter is resting on the ground;

FIG. 6 is a fragmentary view taken along line 6—6 of FIG. 5 with certain parts of the trailer not being shown;

FIG. 7 is an enlarged fragmentary section taken along line 7—7 of FIG. 1; and

FIG. 8 is an enlarged fragmentary section taken along line 8—8 of FIG. 1.

Referring to the drawings, the gooseneck assembly of this invention bearing the general designation 10 will be seen to include a draft member, generally designated 12, and a base member, generally designated 14.

As best seen in FIGS. 1, 2 and 6, draft member 12 includes a pair of longitudinally extending, laterally spaced-apart side members 15 and 16. Side member 15 is shown in the form of a fabricated member including a web plate 18 and top and bottom flanges 19 and 20, respectively. Side member 16, which is opposite hand but otherwise identical in construction to side member 15, includes a web plate 21 and top and bottom flanges 22 and 23, respectively. The side members are held in spaced-apart relation by a plurality of laterally extending structural members 24, 25, 26, 27, 28 and 29.

A pair of longitudinally extending structural members 31 and 32 are mounted in the forward end of the draft member, which structural members have their opposite ends secured to transversely extending structural members 24 and 26. The lower flanges of members 31 and 32 are co-planar with the bottom edges of webs 18 and 21 of the side members, lower flanges 20 and 23 of the side members being cut away forwardly of transversely extending member 26. A flat plate 33 is secured to the lower flanges of structural members 31 and 32 and to the lower edges of web plates 18 and 21, which plate has a king-pin 34 depending therefrom. King-pin 34 is of known type and adapted for engagement with a conventional tractor fifth wheel.

A tractor 36 fragmentarily illustrated in FIG. 3, is shown provided with a conventional fifth wheel 37 of the type adapted for pivoting movement about a horizontal transverse axis. The underside of plate 33 is adapted for engagement with the upper surface of fifth wheel 37 with king-pin 34 in engagement with the fifth wheel, the plate 33 serving as a bearing surface for co-operation with the upper surface of the fifth wheel. By this construction the forward end of draft member 12 is adapted for engagement with a fifth wheel for pivoting movement about the horizontal transverse axis of the fifth wheel and for pivoting movement about the king-pin axis.

A pair of parallel, spaced-apart ear plates 40 are suitably secured to the rear end of side member 15, which ear plates are provided with aligned apertures for receiving opposite ends of a pin 42. Similarly, a pair of parallel, spaced-apart ear plates 43 are suitably secured to the rear end of side member 16, these ear plates being provided with aligned apertures for receiving opposite ends of a pin 44. It will be understood that the apertures in ear plates 40 are of the same size and are co-axial with the apertures in ear plates 43.

Base member 14 includes a flat bottom plate 46 (FIG. 4) and vertically extending side plates 47 and 48 secured at their lower edges to opposite sides of plate 46. Base member 14 also includes a transversely extending structural member 50 at the front end thereof and a further transversely extending structural member 51 at the rear end thereof. An upper flange plate 52 is secured to the upper edge of plate 47, and a vertically extending rear flange plate 53 is secured to the rear vertical edge of plate 47. A transversely and horizontally extending sleeve 54 is secured to plate 47 and the adjacent ends of flanges 52 and 53, which sleeve is adapted rotatably to receive pin 42. Similarly, plate 48 has an upper flange plate 56 secured to the upper edge thereof and a rear flange plate 57 secured to the rear vertical edge thereof. A horizontally and transversely extending sleeve 59, co-axial with sleeve 54, is suitably secured to plate 48 and the adjacent ends of flange plates 56 and 57, sleeve 59 being adapted rotatably to receive pin 44. It should be apparent that by reason of the construction of pins 42, 44 and sleeves 54, 59, base member 14 is adapted for limited pivoting movement relative to draft member 12 about a horizontal axis which is transverse to the draft member.

As best seen in FIG. 6, a generally vertically extending plate 60 is secured to the front vertical edge of plate 47 and one end of structural member 50. A plate 61 identical to plate 60 is secured to the front vertical edge of plate 48 and to the other end of transversely extending structural member 50. Plates 60 and 61 are provided with apertures 62 and 63, respectively. It will be noted that the apertured portions of plates 60 and 61 depend for some distance beneath the bottom surface of base member bottom plate 46.

A horizontally and transversely extending sleeve 65 is secured to one end of structural member 50 and to upper flange plate 52. A second sleeve 66, co-axial with sleeve 65, is secured to the other end of structural member 50 and to upper flange plate 56. A cross-shaft 67 has its opposite ends supported in sleeves 65 and 66. Sleeves 65 and 66 are braced in position by means of a pair of inclined plates 68 and 69, respectively, which inclined plates have their lower ends fastened to the front surfaces of respective plates 60 and 61. It will be understood then that sleeves 65, 66 are rigidly secured to the base member and from an integral part thereof.

A horizontally and transversely extending shaft 70 has its opposite ends mounted in side members 15 and 16. Side members 15 includes a vertically extending re-inforcing member 71 at its point of connection with shaft 70. Similarly, side member 16 includes a vertically extending re-inforcing member 72 located along side member 16 at its point of connection with shaft 70.

A pair of crank members 75 and 76 are rotatably mounted on shaft 70 adjacent opposite ends of the latter. Crank member 75 has a generally vertically extending arm portion 77 in a generally forwardly extending arm portion 78. In like manner, cank member 76 includes a generally vertically extending arm portion 79 and a generaly forwardly extending arm portion 80. A pair of sub-crank arms 82 and 83 are rotatably mounted on shaft 70 and are held in spaced-apart relation between cranks 75 and 76 by means of spacer sleeves 84, 85 and 86. It will be understood that both crank members and both sub-cranks are secured together by means of the spacer sleeves so that both crank members and both sub-cranks rotate together about shaft 70 as a single unit. Of course it will be realized that the crank members and sub-cranks could be rigidly mounted on shaft 70 and journals provided for rotatably mounting the shaft between the side members. Arm portions 78 and 80 and sub-cranks 82 and 83 are provided with co-axial apertures of uniform size for receiving a cross-shaft 90. A spacer sleeve 91 concentric with cross-shaft 90 and encircling the same has its opposite ends secured to sub-cranks 82 and 83.

A lifting arm, generally designated 93, includes a web plate 94 and a rib plate 95. A horizontaly and transversely extending sleeve 96 is secured to the adjacent upper ends of plates 94 and 95, which sleeve is rotatably mounted on the end of cross-shaft 90 between arm portions 78 and sub-crank 82. A second horizonally and transversely extending sleeve 97 is secured to adjacent lower ends of plates 94 and 95, which sleeve is rotatably mounted on cross-shaft 67 adjacent the end thereof received in sleeve 65.

A second lifting arm, generally designated 99, identical in construction to lifting arm 93, includes a web plate 100 and a rib plate 101. A first sleeve 102 is secured to the adjacent upper end of plates 100 and 101, which sleeve is rotatably mounted on cross-shaft 90 between arm portion 80 and sub-crank 83. A second sleeve 104 is secured to the adjacent lower ends of plates 100 and 101, this sleeve being rotatably mounted on cross-shaft 67 adjacent the end thereof received in sleeve 66. A spacer sleeve 106 co-axial with cross-shaft 67 and encircling the same has its opposite ends disposed adjacent the inner ends of lifting arm sleeves 97 and 104.

The extreme upper end of arm portion 77 is apertured for receiving a pin 108 having its opposite ends received in a clevis 109 attached to one end of a piston rod 110 forming a part of a hydraulic ram 111. The forward end of ram 111 includes a pair of parallel ear plates 112 which are apertured for receiving opposite ends of a pin 113, pin 113 being received in an aperture in an ear plate 114 secured to transversely extending structural member 125. In like manner, the extreme upper end of crank arm portion 79 is apertured for receiving a pin 117 having its opposite ends mounted in a clevis 118 which is secured to one end of a piston rod 119 forming a part of a hydraulic ram 120. The forward end of ram 120 includes a pair of parallel spaced-apart ear plates 121 supporting opposite ends of a pin 122, the pin extending through an aperture in an ear plate 123 secured to structural member 25.

It will be understood that suitable means (not shown) are provided for actuating hydraulic rams 111 and 120 in unison. For example, a hydraulic pump may be mounted on the tractor and connected to the hydraulic rams by means of conventional coupling lines. Operation of the hydraulic rams may be controlled by means of a conventional form of valve (not shown) which may be mounted at a convenient location on the gooseneck. It should be apparent that actuation of the hydraulic rams for rearward movement of the piston rods causes upward movement of lifting arms 93 and 99 for pivoting movement of base member 14 in a clockwise direction (as seen in FIGS. 1, 3 and 5) relative to draft member 12. FIG. 1 illustrates the hydraulic rams in their near fully extended position and FIG. 5 illustrates the rams in their near fully retracted position.

As best seen in FIG. 4, base member bottom plate 46 includes rearwardly extending portions 126 and 127 at its rear corners. Plate portions 126 and 127 are braced by means of web plates 128 and 129, respectively, which web plates are secured to respective flange plates 53 and 57 of the base member. Plate portion 126 is apertured and has a forwardly and downwardly extending short tubular member 130 secured to the upper surface thereof around the aperture therein. Similarly, plate portion 127 is apertured and has a forwardly and downwardly inclined short tubular member 131 secured to the upper surface thereof around the aperature in plate portion 127. Each tubular member is adapted to receive a retaining pin, one of which retaining pins is illustrated in FIG. 3 and designated 133.

Secured to the rear surface of transversely extending member 51 intermediate the ends thereof is a vertically extending guide pin 135 having the lower end thereof depending beneath the underside of bottom plate 46. Guide pin 135 is braced in place by means of a pair of plates 136 and 137, which plates have their adjacent ends secured to member 135 and their other ends secured to the rear surface of transversely extending member 51.

A trailer of the low-bed type having its forward end adapted for detachable engagement with base member 14 is generally indicated 140 and is fragmentarily illustrated in FIGS. 1 through 6. It will be understood that trailer 140, which has an elongated low-bed 141, is supported by ground engaging wheels (not shown) only at the rear end thereof.

Trailer 140 includes parallel, laterally spaced-apart, longitudinally extending structural members 142 and 143, which members extend slightly beyond the forward end of bed 141. Preferably the upper flanges of structural members 142 and 143 are co-planar with the deck of bed 141 and form a continuation thereof. Members 142 and 143 include nose plates 144 and 145, respectively, and the longitudinally extending structural members are maintained in lateral spaced-apart relation near their forward ends by means of a transversely extending structural member 146. The forward end of the trailer is further re-inforced by means of a forwardly and downwardly inclined plate 147.

Structural members 142 and 143 support at their forward ends a pair of longitudinally extending pins 149 and 150, respectively. The cylindrical portions of the pins extend forwardly a short distance beyond the nose plates on the structural members, and the pins include forwardly extending tapered portions 149a and 150a.

The upper flange of trailer structural member 142 includes an aperture 152 near the forward end of the member. A forwardly and downwardly inclined tubular member 153 is secured to the underside of the upper flange of member 142 around aperture 152 for defining a retaining pin socket for receiving one of the retaining pins 133. Similarly, the upper flange of structural member 143 is provided with an aperture 154 near the forward end of the member. A downwardly and forwardly inclined tubular member 155 is secured to the underside of the upper flange of member 143 around aperture 154 for receiving the other of retaining pins 133.

Bed 141 includes a deck portion 158 between members 142 and 143 and forward of transversely extending member 146. Deck portion 158 is co-planar with but lower than the deck of bed 141 of the trailer. Mounted on the upper surface of deck portion 158 are a pair of guide plates 159 and 160, each of which guide plates has a longitudinally extending rear portion and a forwardly and laterally outwardly inclined forward portion. The upper edges of both guide plates are generally co-planar with the upper surfaces of deck 141 and member 142, 143.

As mentioned above, base member 14 of the detachable gooseneck of this invention is adapted to be detachably secured to the forward end of trailer 140. This is brought about by resting bottom plate 46 on the upper surfaces of the top flanges of the trailer members 142 and 143 and allowing entry of pins 149 and 150 into respective apertures 62 and 63 of plates 60 and 61 of the base member. As will be mentioned below, alignment of the base member with the forward end of the trailer for quick and easy entry of the pins in the apertured plates on the base member is facilitated by cooperation of depending guide pin 135 and guide plates 159 and 160. When the cylindrical portions of pins 149 and 150 which project forwardly of trailer nose plates 144 and 145 are received in the apertures in plates 60 and 61, tubular members 130 and 131 of the base members are in respective alignment with tubular members 153 and 155 of the trailer. Insertion of the retaining pins in these aligned pairs of tubular members prevents separation of the base member from the forward end of the trailer.

Locking means are provided for locking crank members 75 and 76 in an angular position for holding the forward end of the trailer in its traveling position. The locking means are best illustrated in FIGS. 7 and 8.

A transversely extending, square in cross-section, tubular member 160 has its opposite ends secured to the inner surfaces of arm portions 77 and 79 of the crank members. A pair of horizontally and transversely extending sleeves 161 and 162 are secured to the rear side of member 160 near its ends, which sleeves extend laterally outwardly beyond the rear edges of the crank arms and have their outer ends received in apertures in plates 163 and 164, respectively, which plates are secured to the outer surfaces of the crank arms. Locking pins 166 and 167 are slidably received in respective sleeves 161, 162, which pins have head portions 166a and 167a. Stops 168 and 169 are secured to member 160 and are adapted to be abutted by head portions of the pins for limiting inward movement of the latter.

A bell crank 170 is pivotally mounted on member 160 at the midpoint thereof, which bell crank has one end thereof pivotally mounted in a clevis 171 secured to the outer end of a piston rod 172 forming a part of a cylinder 173 which may be of the pneumatic or hydraulic type. Cylinder 173 includes a plate 174 pivotally mounted on an ear plate 175 which is secured to the inner surface of crank member 76.

A link 178 has one end thereof pivotally mounted to one end of bell crank 170 and the other end thereof pivotally mounted to head 167a of pin 167. Link 178 supports a lug 179, which lug is attached to one end of a spring 180, the other end of the spring being suitably secured to arm portion 79 of crank member 76.

A link 182 has one end thereof pivotally mounted to bell crank 170 and the other end thereof pivotally mounted to head 166a of pin 166. Link 182 supports a lug 183 which is engaged by one end of a spring 184, the spring having the other end thereof suitably secured to arm portion 77 of crank member 75.

It will be apparent that by the locking construction just described, locking pins 166 and 167 are constantly urged outwardly by springs 184 and 180, outward movement of the pins being limited by engagement of their heads with their inner ends of sleeves 161 and 162. Actuation of cylinder 173 in a manner for withdrawing piston rod 172 acts to draw the pins inwardly against the force of the springs. A suitable source of pressure (not shown) is provided for actuation of cylinder 173, and is connected to the latter by suitable conduits. The source of pressure may be carried by the gooseneck itself or on the tractor. Cylinder 133 is preferably actuated by means of a valve of known construction (not shown) mounted on the gooseneck.

A pair of locking pin receptacles mounted to the inner surfaces of side members 15 and 16 cooperate with the locking pins for locking the crank members in a position for holding the forward end of trailer 140 in its traveling position. The locking pin receiving members are best seen in FIGS. 5, 7 and 8.

The locking pin receiving member mounted to the inner surface of web plate 18 of side member 15 includes a pair of rearwardly and downwardly inclined, generally triangular shaped plates 186 and 187. The forwardmost inclined edges of plates 186 and 187 support a ramp plate 188 which extends generally rearwardly and inwardly of the draft member. Between the plates 186 and 187 at the approximate midpoint thereof is a semi-cylindrical member 189, which member extends horizontally inwardly of plate 18 at a right angle therefrom.

The locking pin receiving member mounted on side member 16 is opposite hand but otherwise identical in construction with the locking pin receiving member just described. The locking pin receiving member on side member 16 includes triangular shaped plates 191 and 192 (FIG. 5), a ramp plate 193, and a semi-cylindrical member 194.

It will be understood that the locking pin receiving members are positioned on the inner surfaces of the web plates of the side members so that the ramp plates are engaged by the tips of the locking pins as the vertically extending arm portions of the crank members swing rearwardly. After the locking pins ride up on the ramp members and pass beyond the rearward ends of the latter, the locking pins are snapped or forced outwardly by means of springs 180 and 184, the pins being received in the semi-cylindrical members of the locking pin receiving members. When this occurs the crank members are prevented from swinging forwardly and they are in their proper angular position for locking the base member relative to the draft member in such an angular position that the forward end of the trailer secured to the base member will be held in its traveling position. The locking pins are of course retracted from the semi-cylindrical members by actuation of cylinder 173. It will be apparent that by reason of the ramps and the semi-cylindrical members associated with the locking pin receiving members, locking of the locking pins is automatic upon rearward swinging movement of the crank members, cylinder 173 being provided only for unlocking or retracting the locking pins.

In use, the gooseneck of this invention is engaged with fifth wheel 37 of trailer 36 by means of plate 33 and kin-pin 34 in the manner described above. When the gooseneck assembly is not connected with the forward end of a trailer, the draft member may be supported in a generally horizontal position by inserting a member, such as a wooden block 196, between the tractor frame and the underside of the draft member (FIG. 3). With the gooseneck supported on the tractor in the manner just described, the tractor is backed toward the forward end of the trailer 140 for bringing base member 14 in general alignment with the forward end of the trailer. Prior to the step of connecting base member 14 with the trailer, it may be assumed that the trailer, which has the forward end thereof resting on the ground as illustrated in FIG. 3, has been loaded and is carrying a heavy equipment unit, such as a crane or shovel, etc. Loading of the trailer may be accomplished at the front end thereof by means of ramps (not shown) which extend from the ground up to the upper surface of the trailer deck.

With base member 14 in general alignment with the forward end of the trailer, hydraulic rams 111 and 120 are actuated for manipulating the base member relative to the draft member so that bottom plate 46 of the base member is brought into an approximate parallel relation with the deck of the trailer. The tractor is then backed toward the trailer with bottom plate 46 being allowed to slide along the upper surfaces of trailer members 142 and 143. The lower end of guide pin 135 is received between guide plates 159 and 160 for laterally aligning the base member with the trailer.

Continued backing of the tractor toward the trailer results in reception of the forward ends of pin 149 and 150 in apertures 62 and 63 in plates 60 and 61 forming a part of the base member. Tapered ends 149a and 150a on the pins aid in bringing the base member into proper alignment with the forward end of the trailer. When the rear surfaces of plates 60 and 61 abut respective nose plates 144 and 145, tubular members 130 and 131 on the base member are aligned with tubular members 153 and 155 on the trailer. Retaining pins 133 are then dropped into the aligned pairs of tubular members for preventing separation of the base member from the trailer.

Next, the hydraulic rams of the gooseneck assembly are actuated for rotating crank members in a counterclockwise direction (as seen in FIGS. 1, 3 and 5). This results in upward movement of lifting arms 93, 99 which causes pivoting movement of the base member for raising the forward end of the trailer. As crank members 75 and 76 swing rearwardly during this upward movement of the forward end of the trailer, the locking pins ride up on the ramps of the locking pin receiving members and snap into the semi-cylindrical members associated with the locking pin receiving members. When this occurs the forward end of the trailer is in its traveling position which is illustrated in FIG. 1.

It will be realized that by reason of the gooseneck assembly of this invention, trailer 140 may be easily and quickly unloaded by retracting the locking pins, actuating the hydraulic rams of the gooseneck for lowering the forward end of the trailer for contact with the ground, and then removing retaining pins 133 thereby allowing the base member to be separated from the forward end of the trailer by merely driving the tractor away from the trailer. The trailer may then be unloaded at the lowered front end thereof.

It should be apparent by the gooseneck construction of this invention, which is simple in operation and which contains few moving parts, is readily adaptable for quick and easy engagement with the forward end of a trailer.

It should be noted that the locking pin arrangement of the gooseneck assembly is not an absolutely necessary component but is provided as a safety measure. The main hydraulic rams of the gooseneck assembly may be actuated for holding the crank arms in any desired position. However, by provision of the locking pins the crank arms are locked in their position for holding the forward end of the trailer in its traveling position in the event of failure of the hydraulic cylinders. It should also be pointed out at this time that other forms of actuating members for crank arms may be provided in lieu of the hydraulic rams. For example, screw jacks might be employed for bringing about swinging movement of the crank members.

It should also be noted that the gooseneck of this invention is capable of raising the forward end of the trailer above the traveling position when it is necessary to travel over obstacles in the highway such as railway crossings, etc. Further, the forward end of the trailer may be lowered for allowing a load carried by the trailer to pass beneath overhead highway obstacles. Of course the locking pins must be retracted before lowering of the front end of the trailer can be brought about.

Another advantage of the gooseneck assembly of this invention resides in its capability of engaging and lifting the forward end of the trailer if the latter has become somewhat embedded in the ground by reason of a heavy load being run over the forward end of the trailer, or by reason of the ground not being firm. As pins 149 and 150 are secured to the longitudinally extending structural members of the trailer near the upper portions of the latter, the forward end of the trailer may be partially embedded in the earth and yet pins 149 and 150 may be received in the apertures in places 60 and 61 of the base member.

While the invention has been shown in but one form it will be obvious to those skilled in the art that it is not to be so limited, but on the other hand it is susceptible of various changes and modifications without departing from the spirit and scope of the appended claims. For example, the gooseneck assembly of this invention may be adapted for supporting the rear end of the low-bed trailer from suitable wheeled means.

I claim:

1. A gooseneck assembly for connecting a trailer of the low-bed type to a tractor, said gooseneck assembly comprising a draft member having means at the forward end thereof for engagement with the fifth wheel of a tractor, a base member pivotally supported at the rear end of said draft member for limited pivoting movement about a horizontal axis transverse to said draft member, which base member has a front end extending forwardly of said axis, actuator means carried by said draft member and engageable with said base member adjacent said front end for selectively controlling the position of the base member relative to the draft member, said base member having a bottom surface adapted for engagement with the deck portion of said trailer and said base member having rigidly mounted connection means at the front end thereof, which connection means is adapted for detachably engaging cooperating means on the forward end of said trailer when said bottom surface is engaged with said deck portion, whereby actuation of said actuator means causes relative movement between the draft member and the trailer when the latter is connected with the base member.

2. A gooseneck assembly for connecting a trailer of the low-bed type to a tractor which is provided with a fifth wheel, said gooseneck assembly comprising a draft member having means at the forward end thereof for engagement with said fifth wheel, a base member pivotally supported at the rear end thereof to the rear end of said draft member for limited pivoting movement about a horizontal axis transverse to said draft member, which base member has a front end extending forwardly of said axis, powered means and an associated crank arm carried by the draft member, at least one vertically disposed lifting arm connected with said crank arm for being moved up and down upon actuation of the powered means, which lifting arm has the lower end thereof pivotally attached to said base member adjacent said front end, said base member having a bottom surface adapted for engagement with the deck portion of said trailer and said base member having rigidly mounted connection means at the front end thereof, which connection means is adapted for detachably engaging cooperating means on the forward end of said trailer when said bottom surface is engaged with said deck portion, whereby actuation of said powered means causes relative movement between the draft member and the trailer when the latter is connected with the base member.

3. A gooseneck assembly for connecting a trailer of the low-bed type to a tractor which is provided with a fifth wheel, said gooseneck assembly comprising a draft member having means at the forward end thereof for engagement with said fifth wheel, which draft member includes a pair of laterally spaced-apart, longitudinally extending side members, a base member pivotally supported at the rear end thereof to the rear end of said draft member for limited pivoting movement about a horizontal axis transverse to said side members, which base member has a front end extending forwardly of said axis, a shaft disposed forwardly of said axis and having its opposite end mounted in said side members, a crank arm supported on said shaft, a generally vertically disposed lifting arm having the upper end thereof pivotally connected with an end of said crank arm, powered means carried between said side members and operatively associated with said crank arm so that actuation of the powered means results in upward movement of the lifting arm, said lifting arm having the lower end thereof pivotally secured to said base member adjacent said front end, said base member having a bottom surface adapted for engagement with the deck portion of said trailer and said base member having connecting means at the front end thereof, which connecting means is adapted for detachably engaging cooperating means on the forward end of said trailer when said bottom surface is engaged with said deck portion, whereby actuation of said powered means causes relative movement between the draft member and the trailer when the latter is connected with the base member.

4. The gooseneck assembly according to claim 3 wherein said base member includes retaining means adapted to cooperate with means on said trailer for preventing separation of the latter from the base member.

5. The gooseneck assembly according to claim 3 wherein said powered means includes hydraulic means.

6. A gooseneck assembly for connecting a trailer of the low-bed type to a tractor which is provided with a fifth wheel, said gooseneck assembly comprising a draft member having means at the forward end thereof for engagement with said fifth wheel, which draft member includes a pair of laterally spaced-apart, longitudinally extending side members, a base member pivotally supported at the rear end thereof to the rear end of said draft member for limited pivoting movement about a horizontal axis transverse to said side members, which base member has a front end extending forwardly of said axis, a shaft disposed forwardly of said axis and having its opposite ends mounted in said side members, at least one crank member supported on said shaft for limited swinging movement in a vertical plane, which crank member includes a first generally vertically extending arm and a second generally forwardly extending arm, a generally vertically extending lifting arm having the upper end thereof pivotally connected with the outer end of said second arm, powered means carried between said side members and connected with said first arm so that actuation of the powered means results in upward movement of the lifting arm, said lifting arm having the lower end thereof pivotally secured to said base member at the front end thereof, said base member having a bottom surface adapted for engagement with the deck portion of said trailer and said base member having connection means at the front end thereof, which connection means is adapted for detachably engaging cooperating means on the forward end of said trailer when said bottom surface is engaged with said deck portion, whereby actuation of said powered means causes relative movement between the draft member and the trailer when the latter is connected with the base member.

7. The gooseneck assembly according to claim 6 wherein two crank members are provided in juxtaposed relation and wherein locking means engageable with said side plates and said first arms, respectively, are provided for locking the draft member and the base member in a fixed position relative to each other.

8. The gooseneck assembly according to claim 6 wherein said base member includes retaining means adapted to cooperate with means on said trailer for preventing separation of the latter from the base member.

9. In combination, a low-bed trailer and a gooseneck assembly therefor, said gooseneck assembly comprising a draft member having means at the forward end thereof for engagement with the fifth wheel of a tractor, a base member pivotally supported at the rear end of said draft member for limited pivoting movement about a horizontal axis transverse to said draft member, which base member has a front end extending forwardly of said axis, actuator means carried by said draft member and engageable with said base member adjacent said front end for selectively controlling the position of the base member relative to the draft member, said trailer including an elongated bed having a deck portion and ground engaging wheels at one end thereof, which bed has first connection means at the other end thereof, said base member having a bottom surface in engagement with said deck portion at said other end of the bed, and said base member having rigidly mounted second connection means at the front end thereof in engagement with said first connection means, the engagement of said first and second connection means being brought about by movement of the base member toward said other end of the trailer longitudinally thereof with the first and second connection means in alignment wtih each other.

References Cited by the Examiner

UNITED STATES PATENTS

| | | | |
|---|---|---|---|
| 2,907,581 | 10/59 | Talbert | 280—423 |
| 2,967,720 | 1/61 | Smith et al. | 280—425 |
| 2,978,128 | 4/61 | Polich | 280—425 |
| 3,043,609 | 7/62 | Talbert | 280—423 |

LEO FRIAGLIA, *Primary Examiner.*